(12) United States Patent
Watanabe et al.

(10) Patent No.: US 7,596,312 B2
(45) Date of Patent: Sep. 29, 2009

(54) SMALL-SIZED CAMERA MODULE IN WHICH ADHESIVE DOES NOT FLOW IN SIDE ELECTRODE

(75) Inventors: Takuya Watanabe, Fukushima-ken (JP); Satoshi Wada, Fukushima-ken (JP); Seiichi Nagai, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 371 days.

(21) Appl. No.: 11/788,549

(22) Filed: Apr. 20, 2007

(65) Prior Publication Data
US 2007/0253708 A1 Nov. 1, 2007

(30) Foreign Application Priority Data
May 1, 2006 (JP) .............................. 2006-127786

(51) Int. Cl.
*G03B 17/00* (2006.01)
(52) U.S. Cl. ....................... 396/542; 396/439
(58) Field of Classification Search ................. 396/542
See application file for complete search history.

(56) References Cited
U.S. PATENT DOCUMENTS
5,525,838 A * 6/1996 Kaneko ..................... 257/778

| 6,483,101 | B1 |  | 11/2002 | Webster |  |
|---|---|---|---|---|---|
| 7,291,929 | B2 | * | 11/2007 | Tanaka et al. | ............... 257/784 |
| 7,425,750 | B2 | * | 9/2008 | Glenn et al. | ................. 257/434 |
| 7,515,817 | B2 | * | 4/2009 | Shiraishi et al. | ............... 396/89 |

FOREIGN PATENT DOCUMENTS

JP  2004-88181  3/2004

* cited by examiner

*Primary Examiner*—Rodney E Fuller
(74) *Attorney, Agent, or Firm*—Beyer Law Group LLP

(57) ABSTRACT

A small-sized camera module in which an adhesive does not flow in side electrodes is provided. In the camera module according to the embodiment of the invention, the adhesive does not flow in concave portions thanks to a protection wall for covering top portions of the concave portions formed on a substrate. Accordingly, the side electrodes formed in the concave portions can be securely electrically connected to a contact or a drawing substrate. A lower portion of a holder can be disposed adjacent to the concave portions. Thus, the size of the substrate can be formed as small as possible, so it is possible to obtain the small-sized camera module.

4 Claims, 2 Drawing Sheets

//_US 7,596,312 B2_//

SMALL-SIZED CAMERA MODULE IN WHICH ADHESIVE DOES NOT FLOW IN SIDE ELECTRODE

BACKGROUND OF THE INVENTION

1. Field of the Invention

The present invention relates to a camera module suitable for cellular phones and the like.

2. Description of the Related Art

A known camera module is described with reference to the drawings. FIG. 4 is an exploded perspective view illustrating a main part of the known camera module. A configuration of the known camera module will be described with reference to FIG. 4. A box-shaped holder 51 includes a box-shaped portion 52 and a cylindrical portion 53 extending from the center of the box-shaped portion 52 to the upper part thereof.

A lens 54 is bonded to the cylindrical portion 53 by the aperture portion 55 and an IR cut filter 56 is bonded to the box-shaped portion 52.

A substrate 57 formed of a square shaped insulating plate includes a plurality of concave portions 58 formed on the side thereof. A conductive pattern 59 is formed on the front surface of the substrate 57. The conductive pattern 59 includes side electrodes 59a formed in the concave portions 58.

Additionally, an image sensor 60 is bonded to the substrate 57. The image sensor 60 is connected to the conductive pattern 59 through a wire and the like. The substrate 57 is disposed at the bottom of the box-shaped portion 52 with the image sensor 60 disposed in the box-shaped portion 52. The box-shaped portion 52 is bonded to the substrate 57 by an adhesive (not shown). According to the configuration, the known camera module is formed. For example, the known technology is disclosed in JP-A-2004-88181.

In the camera module having the configuration, side electrodes 59a are wired to an external circuit through the contact of the socket or a drawing substrate.

In the known camera module, since the front surface of the concave portions 58 including the side electrodes 59a is open, the adhesive is extruded from the gap between the box-shaped portion 52 and the substrate 57, so the adhesive consequently flows in the concave portions 58 when the box-shaped portion 52 of the holder 51 is bonded to the substrate 57. Hence, the electric connection between the side electrodes 59a and the contact or the drawing substrate becomes insecure. Additionally, there is a problem of an increase in size when the substrate 57 is made to be enough large to prevent the adhesive from flowing therein.

BRIEF SUMMARY

The present invention solves the above-mentioned problems. It is an object of the invention to provide a small-sized camera module in which an adhesive does not flow in side electrodes.

In order to achieve the object, a camera module according to the embodiments includes a box-shaped holder which holds a lens, a substrate which is bonded to a lower portion of the box-shaped holder and includes a plurality of concave portions on a side thereof, a drawn conductor which is formed on the substrate with side electrodes formed in the concave portions, and an image sensor which is connected to the drawn conductor and bonded to the substrate in a state where the image sensor is located in the box-shaped holder. A lower portion of a box-shaped outer peripheral portion of the box-shaped holder is bonded to the substrate by an adhesive provided therebetween and a protection wall for preventing the adhesive from flowing in the concave portions is formed on top portions of the concave portions where the box-shaped outer peripheral portion is located.

According to the embodiments, the adhesive can not flow in concave portions thanks to a protection wall. Accordingly, the side electrodes can be securely electrically connected to a contact or a drawing substrate. A lower portion of a holder can be disposed adjacent to the concave portions. Thus, the size of the substrate can be formed as small as possible, so it is possible to obtain the small-sized camera module.

According to the embodiments, the protection wall is formed by an extension portion extending from the drawn conductor or a resist film.

According to the embodiments, the protection wall can be formed to be simple and thin. Therefore, it is possible to obtain the camera module which is cheap and has no trouble to make a substrate thin.

According to the embodiments, the substrate includes a laminated substrate in which a plurality of thin films are laminated and the protection wall is formed by the thin film disposed on the top of the laminated substrate.

According to the embodiments, the protection wall can be formed to be simple and thin. Therefore, it is possible to obtain the camera module which is cheap and has no trouble to make a substrate thin.

According to the embodiments, the box-shaped holder includes a protruding portion disposed on the image sensor and the protruding portion is bonded to the image sensor by an adhesive.

According to the embodiments, the holder can be bonded to the substrate and the image sensor. Therefore, the holder can be securely bonded.

According to the embodiments, the adhesive can not flow in concave portions thanks to a protection wall. Accordingly, the side electrodes can be securely electrically connected to a contact or a drawing substrate. A lower portion of a holder can be disposed adjacent to the concave portions. Thus, the size of the substrate can be formed as small as possible, so it is possible to obtain the small-sized camera module.

Other systems, methods, features, and advantages of the invention will be, or will become, apparent to one with skill in the art upon examination of the following figures and detailed description. It is intended that all such additional systems, methods, features, and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DESCRIPTION OF THE PREFERRED EMBODIMENT

Figure 1:
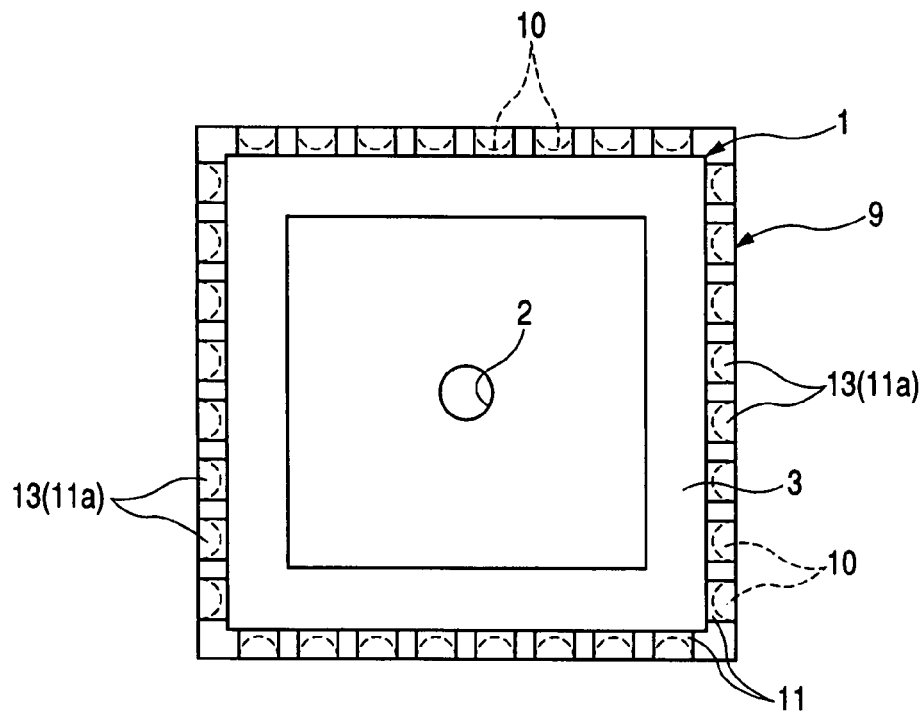
FIG. 1 is a top plan view illustrating a camera module according to a first embodiment.
Figure 2:
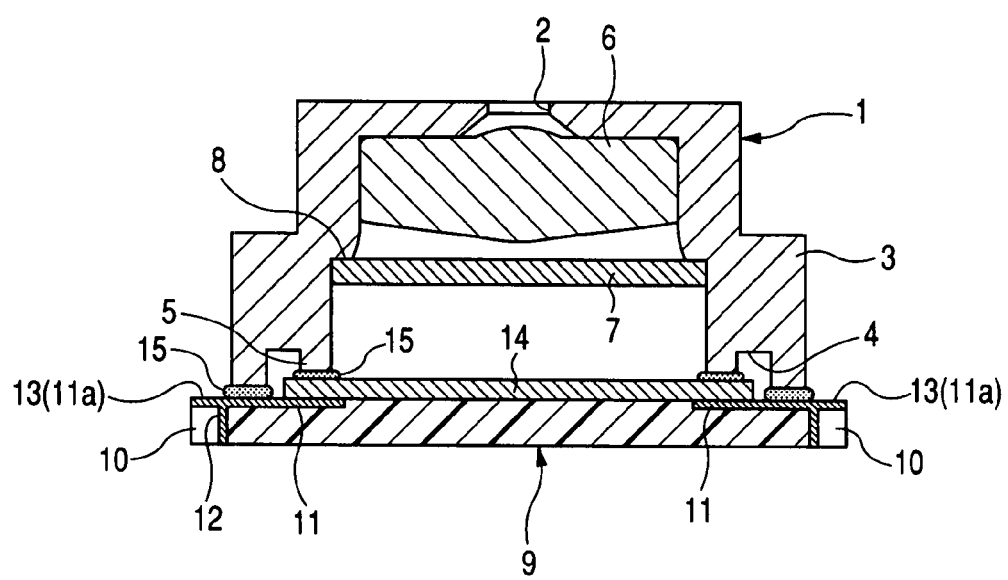
FIG. 2 is a sectional view illustrating a main part of the camera module according to the first embodiment.
Figure 3:
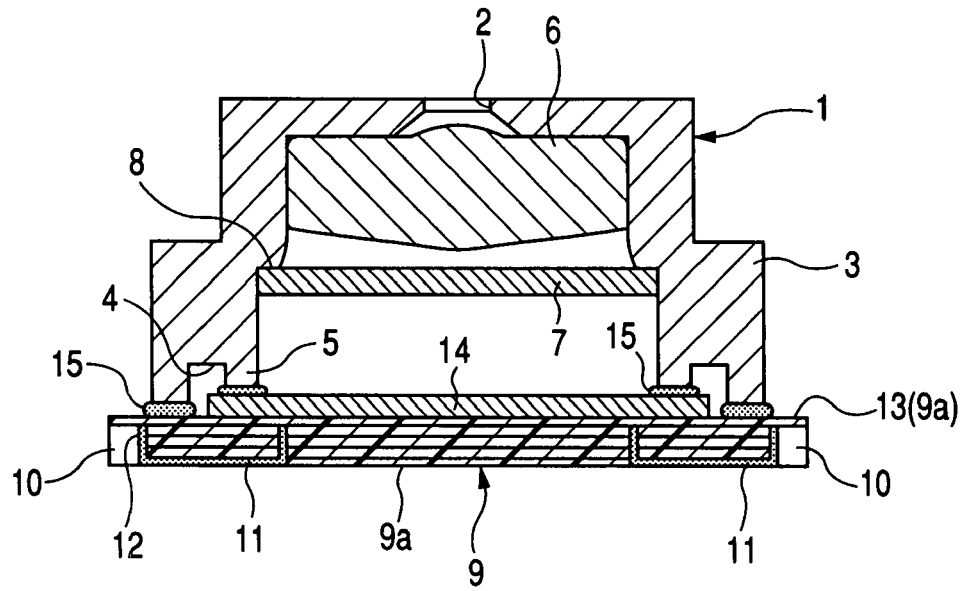
FIG. 3 is a sectional view illustrating a main part of a camera module according to a second embodiment.
Figure 4:
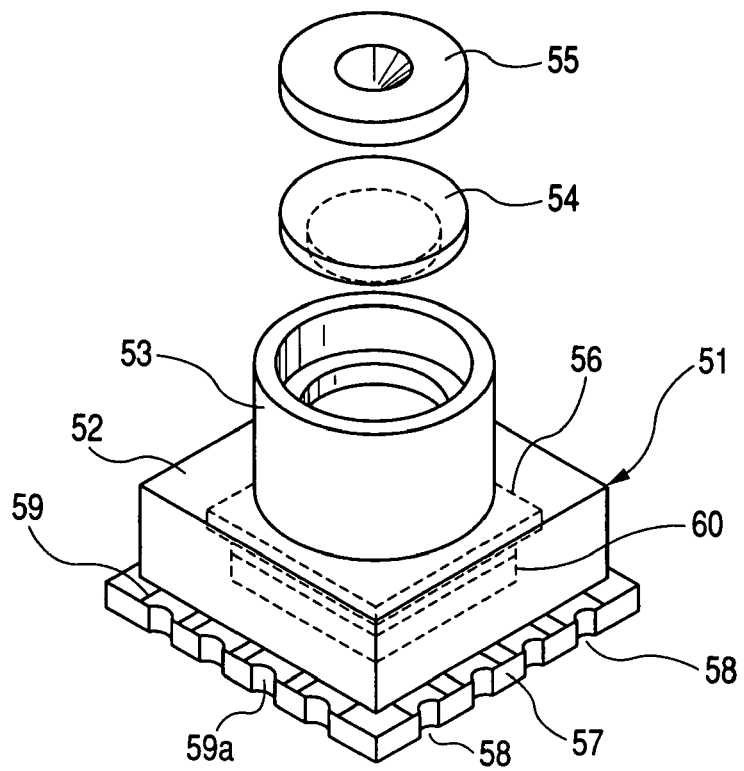
FIG. 4 is a perspective view illustrating a main part of the known camera module.

An embodiment of the invention will be described with reference to the drawings. FIG. 1 is a top plan view illustrating a camera module according to a first embodiment of the invention. FIG. 2 is a sectional view illustrating a main part of the camera module according to the first embodiment of the invention. FIG. 3 is a sectional view illustrating a main part of a camera module according to a second embodiment of the invention.

Next, a configuration of the camera module according the first embodiment will be described with reference to FIGS. 1 and 2. A box-shaped holder 1 formed of a thermoplastic insulation resin includes a via hole 2 formed at the center thereof, a box-shaped outer peripheral portion 3 located in the outer periphery thereof, and a plurality of ring-shaped protruding portion 5 formed in the box-shaped outer peripheral portion 3 and protruded from the lower part of a ceiling portion 4.

A lens 6 is bonded to the top portion in the box-shaped holder 1. An IR cut filter 7 formed of a square glass plate 7 is bonded to the stepped portion 8 in the box-shaped holder 1.

A substrate 9 formed of an insulation material includes a plurality of concave portions 10 formed in the side of the substrate 9 at a predetermined gap. A drawn conductor 11 formed of a conductive pattern such as steel and side electrodes 12 connected the drawn conductor 11 and formed in the inner wall of the concave portions 10 are formed on the surface of the substrate 9.

A protection wall 13 which is formed so as to wall up the top portions of the concave portions 10 is formed on the front surface of the substrate 9. In the embodiment, the protection wall 13 is formed by an extension portion 11a extending from the drawn conductor 11. In addition, the protection wall 13 may be formed of a resist film.

An image sensor 14 is bonded to the center of the substrate 9 with the image sensor 14 connected to the drawn conductor 11 by the use of an adhesive and the like. The substrate 9 to which the image sensor 14 is bonded is disposed so as to wall up the bottom portion of the box-shaped holder 1 with the image sensor 14 disposed in the box-shaped holder 1. Also, the substrate 9 is bonded to the box-shaped holder 1 by the use of an adhesive 15 provided between the box-shaped outer peripheral portion 3 and the image sensor 14. The gap between the image sensor 14 and the box-shaped holder 1 is also bonded by the adhesive 15 provided between the image sensor 14 and the ring-shaped protruding portion 5. Therefore, the small-sized camera module according to the embodiment of the invention is obtained.

Additionally, in the camera module according to the embodiment of the invention, the adhesive 15 is extruded from the gap between the box-shaped outer peripheral portion 3 and the substrate 9 especially in the process of bonding the box-shaped outer peripheral portion 3 with the substrate 9. The extruded adhesive 15 can not flow in the concave portions 10 due to the existing protection wall 13.

Furthermore, in the camera module according to the embodiment of the invention, the side electrodes 12 are connected to the contact of the socket or the drawing substrate through a soldering so as to be wired to the external circuit. At this time, the connection is possible without containing the adhesive 15 in the concave portions 10. Consequently, it is possible to electrically connect the side electrodes 12 to the contact or the drawing substrate without fail.

Besides, the camera module according to the second embodiment is shown in FIG. 3. In the camera module according to the second embodiment, the substrate 9 is formed of a laminated substrate in which a plurality of insulating thin films 9a are laminated. Also, the substrate 9 is formed of the thin film 9a which is located in the top surface thereof for allowing the protection wall 13 to cover the top portions of the concave portions 10. The drawn conductor 11 is formed by the conductors which penetrates the substrate 9 and is provided on the lower surface of the substrate 9 with the substrate 9 connected to the lower surface of the image sensor 14.

Other configuration of the camera module according to the second embodiment has the same configuration as the first embodiment. Therefore, the same components will be marked with the reference numerals used in the first embodiment and the description thereof will be omitted.

What is claimed is:

1. A camera module comprising:
   a box-shaped holder which holds a lens;
   a substrate which is bonded to a lower portion of the box-shaped holder and includes a plurality of concave portions on a side thereof;
   a drawn conductor which is formed on the substrate with side electrodes formed in the concave portions; and
   an image sensor which is connected to the drawn conductor and bonded to the substrate in a state where the image sensor is located in the box-shaped holder,
   wherein a lower portion of a box-shaped outer peripheral portion of the box-shaped holder is bonded to the substrate by an adhesive provided therebetween and a protection wall for preventing the adhesive from flowing in the concave portions is formed on top portions of the concave portions where the box-shaped outer peripheral portion is located.

2. The camera module according to claim 1, wherein the protection wall is formed by an extension portion extending from the drawn conductor or a resist film.

3. The camera module according to claim 1, wherein the substrate includes a laminated substrate in which a plurality of thin films are laminated and the protection wall is formed by the thin film disposed on the top of the laminated substrate.

4. The camera module according to claim 1, wherein the box-shaped holder includes a protruding portion disposed on the image sensor and the protruding portion is bonded to the image sensor by an adhesive.

* * * * *